United States Patent
Lee

(10) Patent No.: US 8,351,061 B2
(45) Date of Patent: Jan. 8, 2013

(54) PRINTING APPARATUS WHICH IS CAPABLE OF EDITING PRINTING DATA, AND A PRINTING METHOD FOR USE WITH THE PRINTING APPARATUS

(75) Inventor: Jin-young Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1561 days.

(21) Appl. No.: 11/830,285

(22) Filed: Jul. 30, 2007

(65) Prior Publication Data

US 2008/0030773 A1 Feb. 7, 2008

(30) Foreign Application Priority Data

Aug. 1, 2006 (KR) .................................. 2006-72676

(51) Int. Cl.
*G06F 3/12* (2006.01)
*G06K 9/00* (2006.01)
*G06F 15/16* (2006.01)

(52) U.S. Cl. ........ 358/1.15; 358/1.9; 358/1.1; 358/1.12; 358/1.13; 358/1.14; 358/1.16; 358/1.18; 358/1.2; 358/1.6; 358/296; 358/502; 358/504; 358/537; 358/538; 358/539; 358/540; 382/112; 382/164; 382/167; 382/175; 382/177; 382/178; 382/179; 382/180; 382/276; 382/282; 709/229; 709/225; 709/247

(58) Field of Classification Search .................... None
See application file for complete search history.

(56) References Cited

U.S. PATENT DOCUMENTS

| 6,693,720 | B1 * | 2/2004 | Livingston | ............ 358/1.15 |
| 6,710,892 | B2 * | 3/2004 | Narushima | ............ 358/1.13 |
| 7,310,156 | B2 * | 12/2007 | Watanabe et al. | ............ 358/1.1 |
| 2004/0190048 | A1 * | 9/2004 | Egawa et al. | ............ 358/1.15 |

FOREIGN PATENT DOCUMENTS

| JP | 01145760 A | * | 6/1989 |
| JP | 2002-192795 | | 7/2002 |
| JP | 2002-288160 | | 10/2002 |
| KR | 10-2005-0097323 | | 10/2005 |

* cited by examiner

*Primary Examiner* — Steven Kau
(74) *Attorney, Agent, or Firm* — Staas & Halsey LLP

(57) ABSTRACT

A printing apparatus, including a user input unit which receives a first user command to initiate a printing operation, a display unit which displays information relating to the printing operation, a printing unit which performs printing with respect to printing data, and a controller which controls the display unit to display reference information of the printing data before the printing, and which controls the printing unit to perform the printing according to a second user command.

26 Claims, 2 Drawing Sheets

PRINTING APPARATUS WHICH IS CAPABLE OF EDITING PRINTING DATA, AND A PRINTING METHOD FOR USE WITH THE PRINTING APPARATUS

CROSS-REFERENCE TO RELATED APPLICATION

This application claims the benefit of Korean Patent Application No. 2006-72676 filed Aug. 1, 2006, in the Korean Intellectual Property Office, the disclosure of which is incorporated herein by reference.

BACKGROUND OF THE INVENTION

1. Field of the Invention

Aspects of the present invention relate to a printing apparatus and a printing method, and, more particularly, to a printing apparatus which is capable of editing printing data, and a printing method for use with the printing apparatus.

2. Description of the Related Art

A printing apparatus including a printer and a multi-function device receives printing data, such as pictures and text, from a host device, such as a computer system, and forms an image on a printing medium such as a printing paper after processing the image.

Once a command to begin a printing operation is issued by a user, a conventional printing apparatus will not allow another command to be issued from the user until the printing operation is completed. That is, an image of the concerned printing data may not be revised or removed (hereinafter, referred to as "image editing") while being printed after the printing command is inputted by the user. Thus, when using the conventional printing apparatus, the user should revise the printing data or remove unwanted printing data before inputting the command to start the printing operation. Otherwise, the user will not be able to edit the printing data until after checking the printed image, and must re-input the command to re-print the edited printing data.

That is, the conventional printing apparatus does not allow the user to edit the printing data while the printing data is being printed. Therefore, the user is required to re-print and discard printed results based on printing data which required further edition, thereby wasting time, paper and toner.

SUMMARY OF THE INVENTION

Accordingly, an aspect of the present invention is to provide a printing apparatus which is capable of editing printing data before performing printing and after a printing command is issued from a user. Another aspect of the present invention is to provide a printing method which allows for the editing of printing data before performing printing and after the printing command is issued from the user.

The foregoing and/or other aspects of the present invention are also achieved by providing a printing apparatus, comprising: a user input unit which receives a first user command to initiate a printing operation; a display unit which displays information relating to the printing operation; a printing unit which performs printing with respect to printing data; and a controller which controls the display unit to display reference information of the printing data before the printing, and which controls the printing unit to perform the printing according to a second user command.

According to an example embodiment of the present invention, the printing apparatus further comprises: an image processor which performs an image process with respect to the printing data, wherein the controller controls the image processor to display an image corresponding to the printing data as the reference information.

According to an example embodiment of the present invention, the controller controls the printing unit to perform at least one of suspending the printing operation and resuming the suspended printing operation according to a user command.

According to an example embodiment of the present invention, the controller controls the printing unit to cancel the printing operation according to a user command when the printing operation is suspended.

According to an example embodiment of the present invention, the controller controls the image processor to revise a printing image to be formed on a printing medium corresponding to the concerned printing data according to a user command when the printing operation is suspended.

According to an example embodiment of the present invention, the image processor performs at least one of removing a part of the printing image, rotating the printing image and revising the printing image according to a control of the controller.

According to an example embodiment of the present invention, the printing apparatus further comprises: a menu generator which generates a menu to be displayed on the display unit, wherein the menu allows for a suspension of the printing operation, a cancellation of the printing operation, a resumption of a suspended printing operation, and an image revision of the printing operation.

The foregoing and/or other aspects of the present invention are also achieved by providing a printing method, comprising: displaying reference information of printing data before conducting a printing operating to print the printing data; and performing one of suspending the printing operation and resuming the suspended printing operation according to a user command.

According to an example embodiment of the present invention, the printing method further comprises: displaying an image corresponding to concerned printing data as the reference information.

According to an example embodiment of the present invention, the printing method further comprises: canceling the printing operation according to a user command when the printing operation is suspended.

According to an example embodiment of the present invention, the printing method further comprises: revising a printing image to be formed on a printing medium corresponding to the concerned printing data according to a user command when the printing operation is suspended.

According to an example embodiment of the present invention, the revising the printing image comprises performing at least one of removing a part of the printing image, rotating the printing image and revising the printing image according to a control of the controller.

According to an example embodiment of the present invention, the printing method further comprises: displaying a menu comprising an item enabling to select at least one of suspension, cancellation, resumption of the printing operation and image revision with respect to the printing data.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
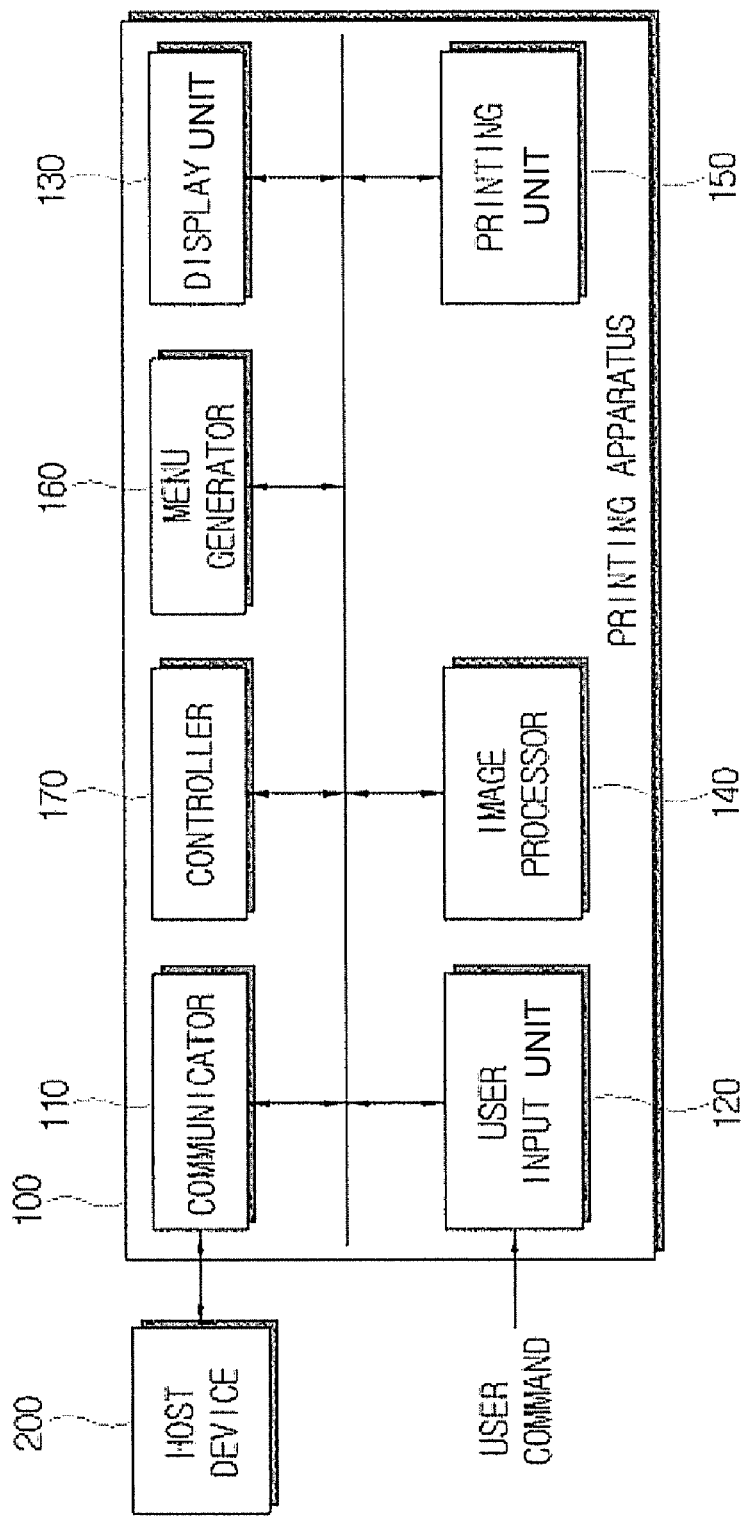
FIG. 1 is a control block diagram of a printing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a control block diagram of a printing apparatus 100 according to an example embodiment of the present invention. The printing apparatus 100 receives printing data, such as pictures and text, from a host device 200, and forms an image on a printing medium, such as a sheet of printing paper or a transparency, during a printing operation. The printing apparatus 100 may be a printer, a photo copier, a facsimile device, or a multi-function device. The host device 200 may control an operation of the printing apparatus 100 and may be a computer system.

As shown in FIG. 1, the printing apparatus 100 comprises a communicator 110, a user input unit 120, a display unit 130, an image processor 140, a printing unit 150, a menu generator 160 and a controller 170. The communicator 110 communicates with the host device 200 through a control of the controller 170. The communicator 110 may comprise a network card, etc. The user input unit 120 receives a user command relating to the printing operation and transmits the user command to the controller 170. The display unit 130 displays information of the printing operation according to the control of the controller 170. According to an embodiment of the invention, the display unit 130 comprises a liquid crystal display (LCD) to display a menu as a user interface. The user input unit 120 and the display unit 130 may comprise an operation panel (OPE).

The image processor 140 processes the printing data according to the control of the controller 170. The image processor 140 generates an image of the printing data that the user desires to print to allow the image to be displayed on the display unit 130. According to an embodiment of the invention, the image comprises a replication of the image to be printed on the printing medium at a reduced size and is hereinafter referred to as a "printing image." Further, units of the printing data may be organized according to the page the printing data will be printed on. In this case, the printing image comprises a reduced image of a certain page of the printing data.

The image processor 140 allows for a revision of the printing image according to the control of the controller 170. More specifically, the image processor 140 may remove a part of the printing image, may rotate the printing image, and may revise the printing image, etc, according to user commands. The printing unit 150 prints the printing data according to the control of the controller 170. The printing unit 150 may comprise a printing engine (not shown) operated in accordance with an inkjet method, a laser printing method, etc.

The menu generator 160 generates a menu to operate as a user interface and supplies the menu to the display unit 130 according to the control of the controller 170. The menu comprises items enabling a selection of a suspension of printing operations, a cancellation of the printing operations, a resumption of the suspended printing operations or an image revision, etc.

The controller 170 controls the printing apparatus 100. When the host device 200 transmits the printing data and a corresponding user command to print the printing data, the controller 170 controls the foregoing elements to print the concerned printing data. The controller 170 controls the image processor 140 to display the image of the concerned printing data on the display unit 130 before the printing of the printing data and after the printing command is issued from the user. Also, the controller 170 controls the printing unit 150 to print the concerned printing data according to a user command that is inputted through the user input unit 120.

In particular, the controller 170 may control the printing unit 150 to suspend the printing operation or to resume the suspended printing operation according to a user command. In addition, when the printing operation is suspended, the controller 170 may control the printing unit 150 to cancel the printing operation according to a user command. Further, the controller 170 may control the image processor 140 to revise the printing image of the concerned printing data according to a user command when the printing operation is suspended. The controller 170 may comprise a computer program and a memory, such as a ROM (not shown) to store the computer program, a central processing unit (CPU), and random access memory (RAM) to execute the computer program.

Figure 2:
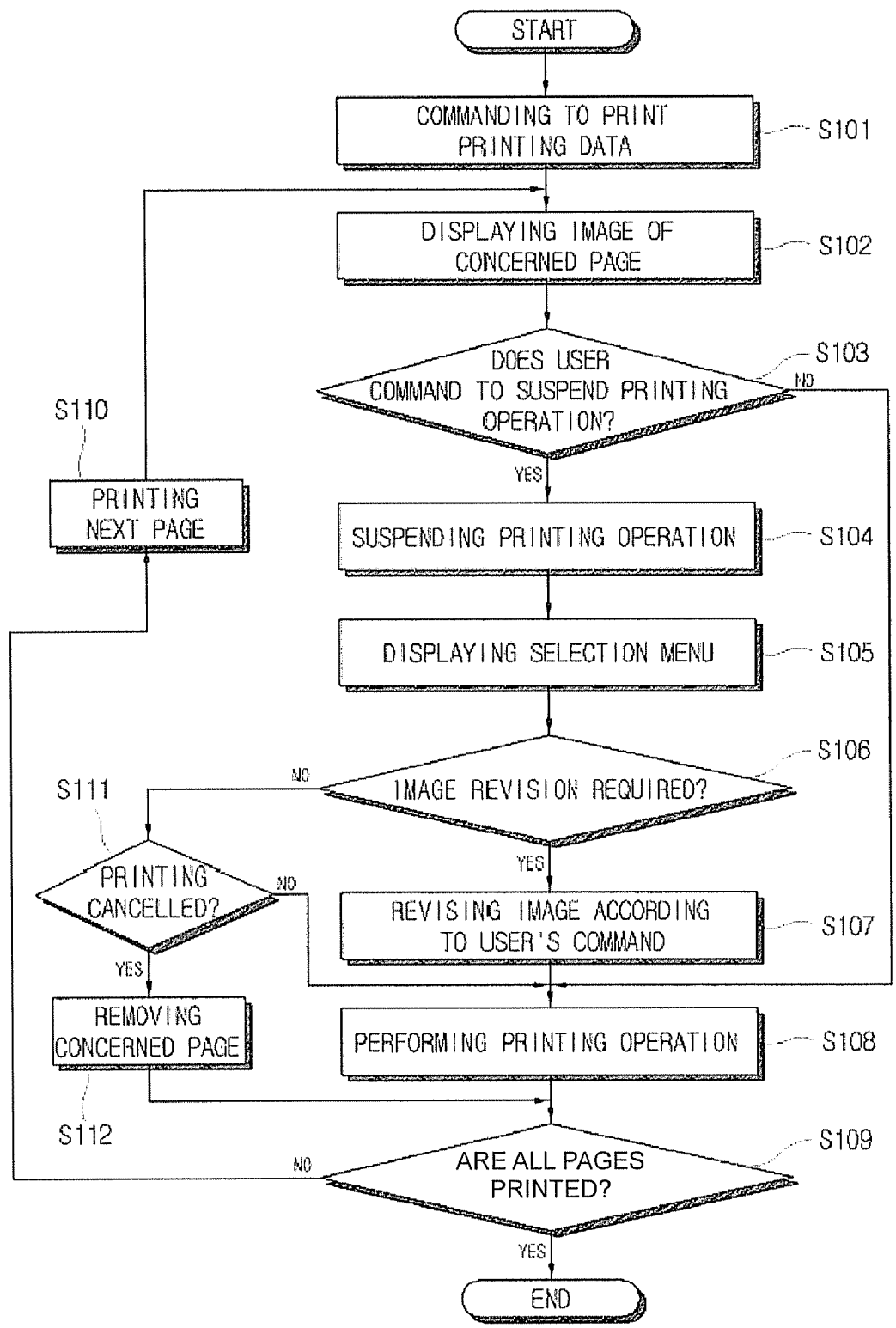
FIG. 2 is a control flowchart of a printing method according to the embodiment of the present invention.

Referring to FIG. 2, the operation of the printing apparatus 100 according to the present invention will be described in detail. First, the controller 170 determines whether the printing data and the printing command are transmitted from the host device 200 at block S101. When the printing command is determined to have been transmitted from the host device 200, the controller 170 controls the image processor 140 to display the printing data, i.e., the reduced image of the page to be printed at block S102.

Then, the controller 170 determines whether a user suspends the printing operation through the user input unit 120 at block S108. If the user does not suspend the printing operation at block S103, the controller 170 controls the printing unit 150 to print the concerned printing data at block S108.

The controller 170 determines whether all of the pages of the printing data are completely printed at block S109. If all of the pages are determined to have been printed, the controller 170 completes the operation of the printing apparatus 100. If all of the pages are determined not to have been printed as determined at block S109, the controller 170 increases a page count to print the next page at block S110. Then, the controller 170 controls the image processor 140 to display the reduced image of the next page at block S102.

If the user suspends the printing operation at block S103, the controller 170 controls the printing unit 150 to suspend the printing operation at block S104. Then, the controller 170 controls the menu generator 160 to generate and display a selection menu to allow for the input of a user command at block S105. The controller 170 then determines whether the user command has been inputted through the user input unit 120 at block S106.

If the user command is determined to comprise an image revision command at block S106, the controller 170 controls the image processor 140 to revise the concerned printing image according to the user revision command at block S107. When the image revision is completed, the controller 170 controls the printing unit 150 to print the revised printing data at block S108.

If the inputted user command does not comprise the image revision command at block S106, the controller 170 determines whether the user command comprises a cancellation of all or part of the printing operation at block S111. For example, the cancellation of the printing operation may comprise a cancellation of the printing operation with respect to the concerned page. If it is determined that the user command does not comprise the cancellation of the printing operation, the controller 170 controls the printing unit 150 to print the revised printing data at block S108.

If the user command is determined to comprise the cancellation of the printing operation at block S111, the controller 170 removes the printing data with respect to the concerned page at block S112, and proceeds with block S109.

As is described above, aspects of the present invention provide a printing apparatus which is capable of editing printing data before the data is printed and after a corresponding printing command is issued from a user, and a printing method to operate the printing apparatus. That is, the printing apparatus, according aspects of the present invention, edits the printing data before the printing operation and after the printing command is issued from a user and minimizes an inconvenience to the user due to an advance image editing. Also, the printing apparatus, according to aspects of the present invention, allows for the later editing of an image, thereby saving time, paper and toner.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A printing apparatus, comprising:
a display unit which displays information relating to a printing operation;
a printing unit which performs printing with respect to printing data;
an image processor which performs an image process with respect to the printing data; and
a controller which, while the printing unit prints a first printing image from among plural printing images, controls the image processor to display a second printing image from among the plural printing images on the display unit,
wherein the controller:
edits printing data of the second printing image;
controls the printing unit to perform printing with respect to the edited printing data;
controls the printing unit to perform suspending the printing operation while editing the printing data of the second printing image; and
controls the printing unit to perform resuming the suspended printing operation after editing the printing data of the second printing image,
wherein when the editing of the printing data by the controller comprises cancelling printing of the second printing image, the controller determines whether all images among the plural printing images have been printed, and when all images among the plural printing images have not been printed, a next printing image from among the plural printing images is displayed.

2. The printing apparatus according to claim 1, further comprising a user input unit which receives a user command to initiate the printing operation, wherein the controller edits printing data of the second printing image in response to the user command received through the user input unit.

3. The printing apparatus according to claim 1, wherein the editing of the printing data comprises at least one of removing the second printing image, rotating the second printing image and revising the second printing image.

4. The printing apparatus according to claim 1, further comprising a menu generator which generates a menu to be displayed on the display unit, wherein the menu allows for a suspension of the printing operation, a cancellation of the printing operation, a resumption of a suspended printing operation, and an image revision of the printing operation.

5. The printing apparatus according to claim 1, wherein the second printing image is plural.

6. The printing apparatus according to claim 1, wherein the displayed second printing image comprises a replication of an image to be printed at a reduced size, and the controller controls the display unit to display the edited second printing image.

7. The printing apparatus according to claim 6, wherein units of the printing data are organized according to a page the printing data will be printed on among one or more pages, and the controller controls the image processor to display a next page of the printing data at a reduced size, when it is determined by the controller that not all pages of the printing data are completely printed.

8. A printing method, comprising:
printing a first printing image from among plural printing images;
displaying, using an image processor, a second printing image from among the plural printing images while printing the first printing image;
editing printing data of the second printing image;
printing the edited printing data;
controlling a printing unit to perform suspending the printing operation while editing the printing data of the second printing image;
controlling the printing unit to perform resuming the suspended printing operation after editing the printing data of the second printing image,
wherein when the editing of the printing data by the controller comprises cancelling printing of the second printing image, and determining whether all images among the plural printing images have been printed, and displaying a next printing image from among the plural printing images when all images among the plural printing images have not been printed.

9. The printing method according to claim 8, wherein the editing printing data of the second printing image is performed according to a user command.

10. The printing method according to claim 8, wherein the editing of the printing data comprises at least one of removing the second printing image, rotating the second printing image and revising the second printing image.

11. The printing method according to claim 8, further comprising displaying a menu comprising an item to enable a selection of at least one of suspension of the printing operation, cancellation of the printing operation, resumption of the printing operation and image revision of the printing data.

12. The printing method according to claim 8, wherein the second printing image is plural in number.

13. The printing method according to claim 8, wherein the displaying the second printing image comprises displaying a replication of an image to be printed at a reduced size, and the method further comprises controlling the image processor to display the edited second printing image.

14. The printing method according to claim 13, further comprising organizing units of the printing data according to a page the printing data will be printed on among one or more pages, and displaying a next page of the printing data at a reduced size, when it is determined by the controller that not all pages of the printing data are completely printed.

15. An apparatus to manage a printing operation with respect to printing data that has previously been initiated in the apparatus, the apparatus comprising:
   a user input unit to allow a user to input a command to alter the printing operation;
   an image processor to process the command and to alter the printing operation;
   a printing unit to suspend the printing operation while the image processor alters the printing operation, and to resume the suspended printing operation once the altering of the printing operation is completed,
   wherein altering the printing operation includes revising the printing data,
   wherein when the image processor alters the printing operation by cancelling printing of a portion of the printing data during suspension of the printing operation, a controller determines whether printing data remains to be printed, and when printing data remains, the image processor processes printing data from among the remaining printing data.

16. The apparatus according to claim 15, further comprising a communicator to communicate with a host device through which the user generates the printing data.

17. The apparatus according to claim 15, further comprising a display unit to display an image of the printing data to a user.

18. The apparatus according to claim 17, further comprising a menu generator to generate a menu to be displayed by the display unit to indicate printing operation altering options.

19. The apparatus according to claim 15, wherein the command input by the user includes a command to suspend the printing operation.

20. The apparatus according to claim 19, wherein the command input by the user further includes a command to revise the printing data by revising a section of the printing data, removing a section of the printing data, and/or by rotating a section of the printing data.

21. The apparatus according to claim 20, wherein the command input by the user further includes a command to cancel the printing operation.

22. A method of managing a printing apparatus that allows for a revision of printing data, the method comprising:
   receiving a command to conduct a printing operation with respect to the printing data from a user;
   displaying, using an image processor, an image to represent a portion of the printing data to the user;
   determining whether the user issues a command to suspend the printing operation;
   suspending the printing operation if the suspension command is issued;
   determining, when the printing operation is suspended, whether the user issues a command to revise the portion of the printing data;
   revising the portion of the printing data when the revision command is issued, and resuming the suspended printing operation after the revising is completed;
   performing the printing operation with respect to the portion of the printing data; and
   determining whether the printing operation has been completed with respect to all of the printing data,
   wherein if the command to revise the portion of the printing data is not issued while the printing operation is suspended, the method further comprises:
   determining whether the printing of the portion of the printing data is cancelled;
   determining whether the printing operation has been completed with respect to all of the printing data when the printing of the portion of the printing data is cancelled; and
   displaying a new image representing a portion of remaining printing data from among the printing data, when printing with respect to all of the printing data has not been completed.

23. The method according to claim 22, further comprising displaying a selection menu to indicate selections available to the user after the suspension of the printing operation.

24. The method according to claim 22, wherein, if the user does not issue a command to suspend the printing operation, the performing of the printing operation with respect to the portion of the printing data and the determining of whether the printing operation has been completed with respect to all of the printing data are conducted.

25. The method according to claim 22, wherein, if the user does not issue the command to cancel the printing operation with respect to the portion of the printing data, the performing of the printing operation with respect to the portion of the printing data and the determining of whether the printing operation has been completed with respect to all of the printing data are sequentially conducted.

26. The method according to claim 22, further comprising performing the printing operation with respect to a subsequent portion of the printing data.

* * * * *